May 26, 1925.

F. VINCENT

STEERING WHEEL LOCK 1,539,446

Original Filed June 22, 1921    3 Sheets-Sheet 1

Inventor
Frederick Vincent
By Edward N. Paulsen
Attorney

May 26, 1925.
F. VINCENT
STEERING WHEEL LOCK
Original Filed June 22, 1921     3 Sheets-Sheet 2
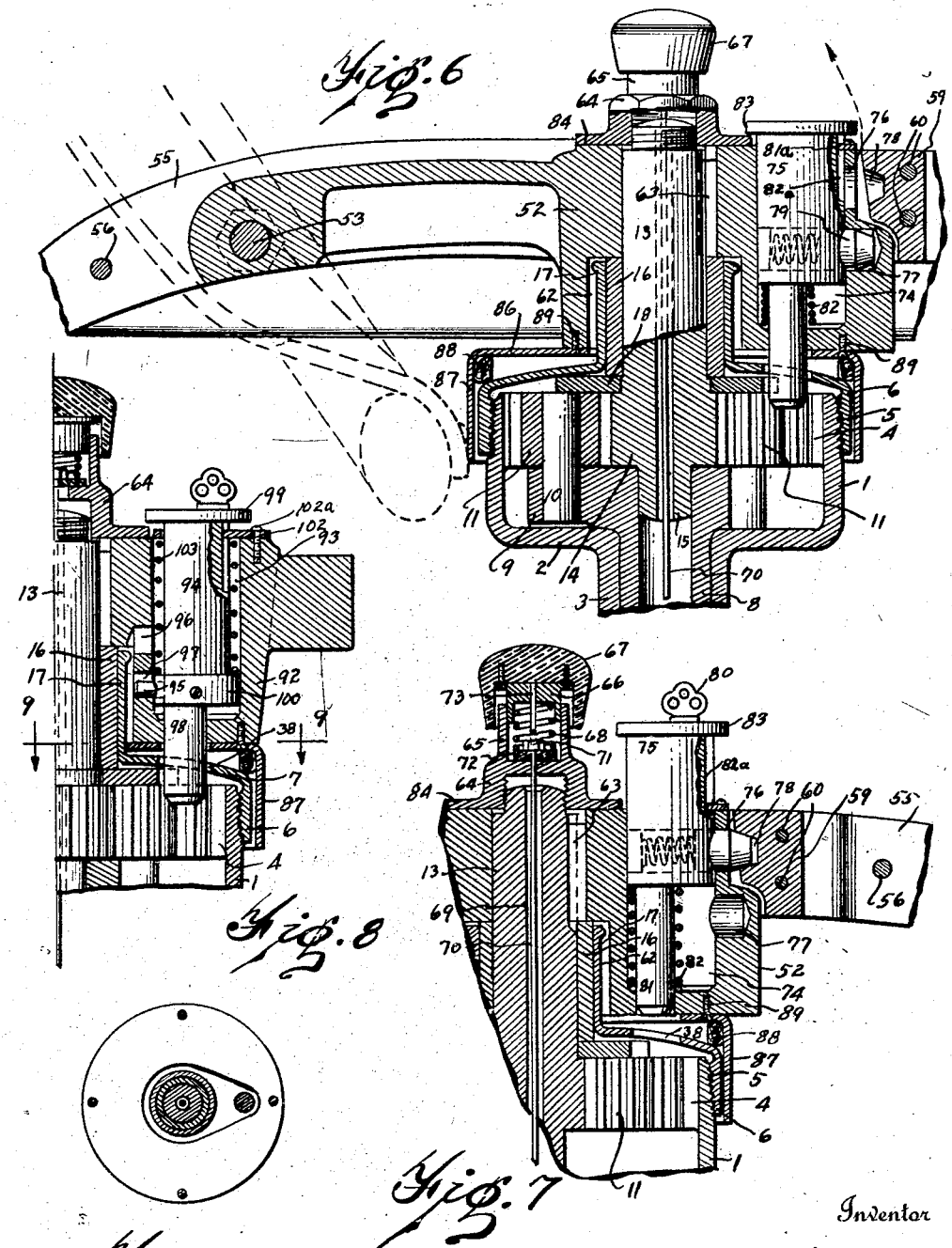
Inventor
Frederick Vincent
By Edward N. Pagelsen
Attorney

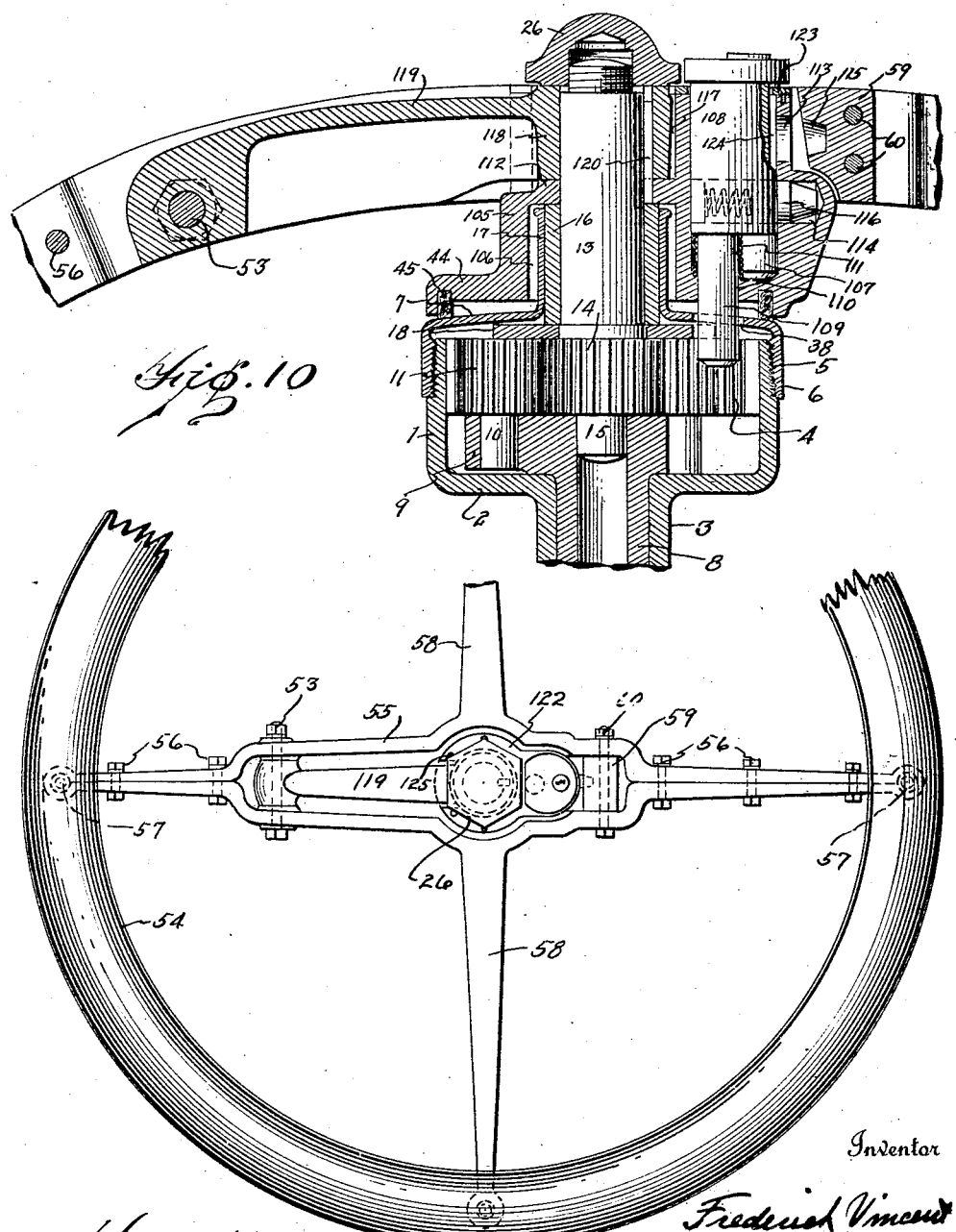

Patented May 26, 1925.

1,539,446

UNITED STATES PATENT OFFICE.

FREDERICK VINCENT, OF DETROIT, MICHIGAN.

STEERING-WHEEL LOCK.

Original application filed June 22, 1921, Serial No. 479,627. Divided and this application filed January 19, 1923. Serial No. 613,534.

*To all whom it may concern:*

Be it known that I, FREDERICK VINCENT, a citizen of the United States, and residing at Detroit, in the county of Wayne and State of Michigan, have invented a new and Improved Steering-Wheel Lock, of which the following is a specification.

This invention relates to steering wheels adapted for but not limited to use on the Ford type of automobiles, that is, motor vehicles in which the steering shaft is in two parts connected by a speed reducing mechanism mounted in a casing at the upper end of the steering post and a steering wheel is attached to one of said parts, and its object is to provide a structure of this character in which the steering wheel may be locked to said casing to prevent the wheel and the two parts of the shaft from turning. This application is a division of my co-pending application Serial Number 479,627, filed June 22, 1921.

This invention consists in a main steering shaft mounted in the usual steering post of a vehicle, a casing at the upper end of the post, a stub shaft, and a steering wheel thereon, the stub shaft extending down into the casing and preferably guided in a central bore of the main shaft, gears connecting the shafts, and means mounted on the steering wheel and adapted to extend into the casing to prevent the actuation of the main shaft by the stub shaft.

This invention further consists in a lock barrel mounted in the steering wheel and having a bolt adapted to be moved into the casing between the gears therein to prevent the actuation of the main shaft by the stub shaft.

This invention also consists in a cover for the cap of the casing into which the two parts of the steering shaft extend, the cover preventing removal of the cap from the casing and access to the planetary gearing which is mounted within the casing.

This invention also consists in the details of construction illustrated in the accompanying drawings and particularly pointed out in the claims.

Figures 1, 2:
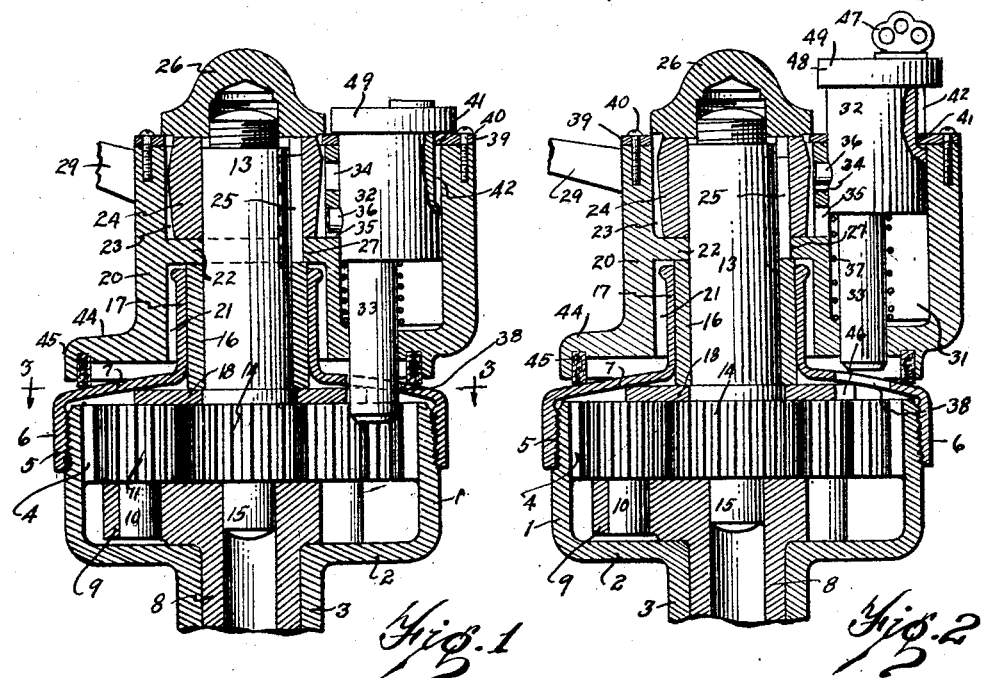
Figure 5:
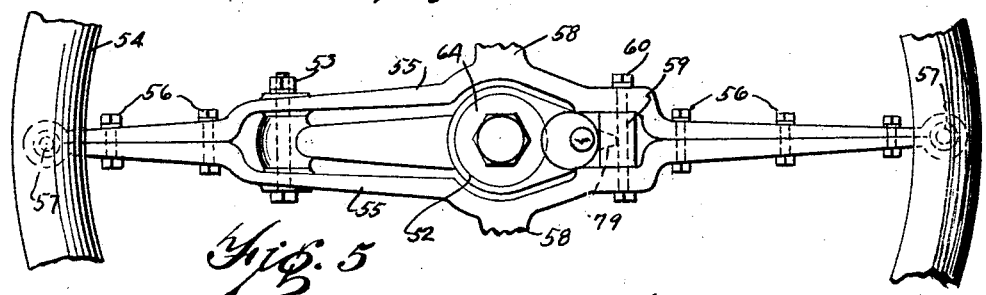
Figures 3, 4:
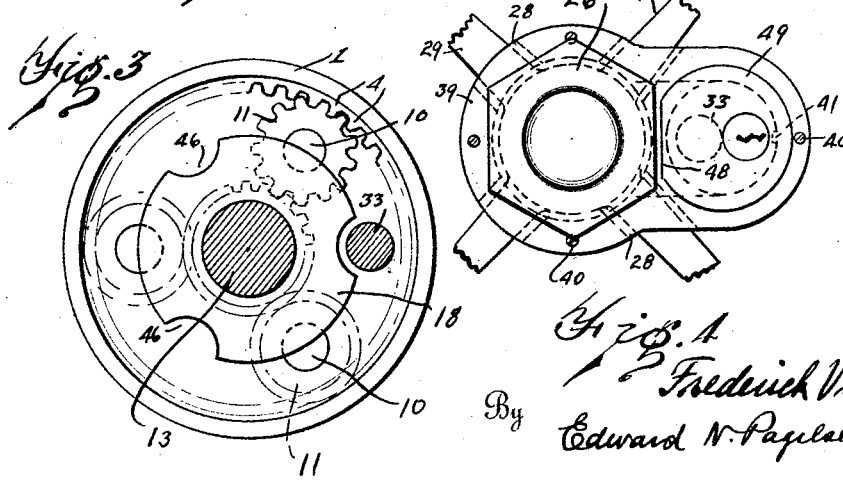

In the accompanying drawings, Figs. 1 and 2 are central longitudinal sections of the gear casing and hub of a steering wheel showing a lock in two positions. Fig. 3 is a section on the line 3—3 of Fig. 1. Fig. 4 is a plan of the steering head and lock. Fig. 5 is a plan of the central portion of a tilting-locking steering wheel embodying the present invention. Fig. 6 is a longitudinal section thereof and of the gear casing connected thereto. Fig. 7 is a similar section of a wheel showing the lock in inoperative position. Fig. 8 is a similar view showing a modified form of lock in operative position. Fig. 9 is a section on a smaller scale on the line 9—9 of Fig. 8. Fig. 10 is a section similar to Fig. 6 of still another modification of this steering wheel. Fig. 11 is a plan thereof.

Similar reference characters refer to like parts throughout the several views.

The present structures differ from most of those of the prior art in that the steering shaft and wheel may be locked against rotating, the devices of the prior art being usually constructed to release the wheel from the steering shaft and a lock being usually provided to prevent the connector between the steering wheel and steering shaft from being moved into operative position. In order to lock the steering wheel from turning, a relatively stationary part of the vehicle must be employed, and in the present case I make use of the gear casing which encloses the reduction gearing between the steering wheel and the main steering shaft, the casing being rigid with the upper end of the steering post within which the steering shaft is mounted. As the steering shaft and steering post are well known in this art, I have shown only the upper ends thereof.

Referring now to Figs. 1 to 4 inclusive, the cylindrical casing 1 has a bottom 2 attached to the top of the steering post 3, and is also provided with interal rack teeth 4 and external threads 5 to receive the internally threaded flange 6 of the cap 7. The upper end of the main steering shaft 8 is formed with a flange 9 which carries pins 10 on which the planetary gears 11 are mounted. A stub shaft 13 has a pinion 14 attached to or formed integral with it and its lower end 15 extends down and is journaled in the bore of the main shaft 8. A bushing 16 within the sleeve 17 on the cap 7 also serves to guide this stub shaft. The mechanism thus far described is well known.

I provide a washer 18, shown in Fig. 3, on which the bushing 16 is permitted to rest in order to elevate it so that it may serve to support the steering head 20 whose out-line is shown in Fig. 4, and which has a recess 21 to receive the sleeve 17 on the cap, an internal flange 22 to rest on the bushing 16, and an upper recess 23 to receive the hub 24 of the steering wheel which fits on the upper end of the stub shaft 13 and is secured thereto by the key 25 and nut 26. The key 25 extends down through a key seat or notch 27 in the internal flange 22, as shown in Figs. 1 and 2, in order to cause the steering head to turn with the steering wheel. I also provide the steering head with lateral notches 28, indicated in dotted lines in Fig. 4, through which the arms 29 of the steering wheel extend.

The steering head is also formed with a longitudinal recess 31 to receive the lock body 32, with a longitudinal hole through which the locking bolt 33 extends from the lock body, and with two lateral notches 34 and 35 into which the latch pin 36 may extend. A spring 37 presses upward against the lock body, and the cap 7 of the gear casing has openings 38, preferably three in number, through which the bolt 33 may move down among the gears in this casing. A plate 39 is secured to the top of the steering head by means of screws 40 to help secure the steering wheel to the steering head and this plate is preferably formed with a tongue 41 which extends into a groove 42 in the lock barrel and limits its movement. If desired, the steering head may be formed with a flange 44 having a groove to receive the packing strip 45 which prevents dust getting up into the recess 21. The washer 18 is formed with any desired number of notches 46 to permit the locking bolt to pass down between the planetary gears 11.

When the parts are as shown in Fig. 2 and the steering wheel is rotated, the pinion 14 rotates with it and causes the planetary gears to rotate and revolve around the axis of the stub shaft 13. But this is prevented when the locking bolt 33 is moved down into the space between any two of these planetary gears, where the bolt 33 will be held by the latch pin 36 when it extends into the notch 35. The wheel cannot be released except by the use of a key 47.

So long as the steering wheel is locked from turning, the nut 26 is prevented from turning by the flat side 48 on the upper flange 49 of the lock barrel. See Fig. 4. But when the lock and wheel are released by a person holding a key for the lock, the flange is raised sufficiently to permit this nut to be removed, after which the steering head may be taken off.

When a steering wheel is desired which can be tilted or swung up to give more room for the entrance of the driver; the structure shown in Figs. 5 to 9 may be employed. The casing, the gears therein and the stub shaft are the same as those above described.

The steering head 52 has an arm 51 which carries a bolt 53 in its outer end on which the spider of the steering wheel 54 is mounted. See also Fig. 11. This spider consists of duplicate parts, each consisting of the arms 55 which are connected by the bolts 56 and which are secured to the rim by screws 57, and of the arms 58 which extend radially in opposite directions from the central parts of the arms 55 to the rim. A latch block 59 is secured between the arms 55 by the bolts 60.

The steering head has a recess 62 to receive the sleeve 17 and bushing 16, on which the head rests. A key 63 and nut 64 secure the head to the stub shaft 13 and this nut may be formed with a flange 65 to receive the hub 66 of a horn button 67 which is normally held up by the spring 68. See Fig. 7. The stub shaft 13 is formed with a passage 69 for the horn wire 70 which is provided with a nut 71 at its upper end, the washer 72 of non-conducting material serving to center and support the nut. A stem 73 is adapted to close the horn circuit when the button 67 is depressed.

The steering head has a recess 74 for the lock body 75 and two notches 76 and 77, the former normally registering with the notch 78 in the latch block 59. The lock has a locking bolt 81 and a latch pin 79 adapted to be withdrawn by the key 80 and the body is under upward tension by the spring 82 so that as soon as the key is turned to withdraw the latch pin 79 from the notch 77, the spring presses the lock upward to the position shown in Fig. 7. The upward movement of the lock is limited by the tongue 81ª secured to the steering head and slidable in the groove 82ª. When the lock is in its upper position, the latch pin is forced into the notch 76 in the head and into the notch 78 in the latch block, which locks the steering wheel from tilting and also releases the steering head from the gear casing so that the steering shaft may be turned by the steering wheel. It will be noticed that the flange 83 on the lock body 75 extends over the circular edge 84 of the nut 64 when the lock is depressed so that this nut cannot be released until the key 80 has been turned to withdraw the latch pin 79 from the recess 77 to permit the lock to move to the position shown in Fig. 7.

A cup shaped shield consisting of the circular portion 86 and the flange 87 may be attached to the lower end of the wheel head 52 by means of screws 89 to prevent access to the cap 7, and planetary gearing, and a packing ring 88 may be placed between this shield and cap to keep out dust. The part or cover 86 may be of hardened metal.

In the structure shown in Figs. 8 and 9, the casing 1 and the parts connected thereto are practically the same as those above described. The wheel head 92 is formed with a recess 93 to receive the lock body 94 which has a latch pin 95 adapted to enter the notches 96 and 97. The locking bolt 98 is the same and for the same purpose as the bolts 33 and 81 of the above described constructions.

The lock body has a flange 99 at its upper end and a collar 100 at its lower end, which collar is secured in the position shown after the plate 102 and spring 103 are slipped onto the lock body. The lock body and the spring 103 are then slipped down into the recess 93 and the plate 102 is secured in position by the screws 102$^a$. In this case, the locking bolt is normally pressed down between the planetary gears and when the latch pin 95 is withdrawn from the notch 96, the spring 103 will force down this bolt 98. It will strike the plate 7, after which the steering wheel will be turned until this locking bolt registers with an opening 38 in the cap 7 and enters the casing.

The structure shown in Fig. 1 embodies a casing, stub shaft, steering head and steering wheel. That of Fig. 2 embodies a casing, stub shaft, wheel head and steering wheel. The structure shown in Figs. 10 and 11 embodies a casing, stub shaft, steering head, steering wheel head and steering wheel.

The casing, stub shaft and the parts between them are the same as those shown in Fig. 1. The steering wheel is constructed in the same maner as that shown in Fig. 5 and the same reference characters are used to designate similar parts.

The steering head 105 has a recess 106 into which the sleeve 17 and bushing 16 extend and a recess 107 in which the lock body 108 is slidably mounted, the body having a locking bolt 109 extending down through the opening 110 in the head. A spring 111 is mounted in this recess 107. The steering head also has an internal flange 112 which rests on the bushing 16 and is positioned thereby. It is further provided with the notches 113 and 114, the former being alined with the notch 115 in the latch block 59 so that when the steering wheel is in the position indicated in these two drawings, the latch pin 116 will extend through the notch 113 into the notch 115 and prevent the wheel from tilting. As in the structure shown in Fig. 1, the steering head may have a flange 44 provided with a packing ring 45 to bear on the cap 7 and prevent dust from entering the recess 106 and the openings 38 in the cap 7.

The steering head has a recess 117 to receive the hub 118 of the wheel head which has an arm 119 in whose outer end the pin 53 is mounted as above described. The wheel head and the steering head are keyed to the shaft 13 by a key 120 and by a nut 26.

A plate 122 is secured to the top of the steering head and assists to retain the wheel hub in position. This plate may also have a tongue 123 which extends into the groove 124 in the lock body to limit its movement. The difference between the steering heads of Figs. 1 to 4 inclusive and of Figs. 10 and 11 lies chiefly in the slots 28 through which the four arms of the steering wheel spider extend and in the slot 125 through which the arm 119 of the wheel head extends. The same pattern may be used for both steering heads.

The details of construction and the proportions of the parts may all be changed by those skilled in the art without departing from the spirit of my invention as set forth in the following claims.

I claim:—

1. In steering mechanism, a rotatable steering shaft, a steering wheel mounted thereon to turn therewith and removable endwise of said shaft, a nut having flat sides and attached to said shaft and engaging said wheel to prevent removal of said wheel, and a slidable locking member having engagement with a flat side of the nut to prevent removal of said nut from the shaft, removal of said wheel being prevented until the nut is removed from the shaft.

2. In steering mechanism, a rotatable steering shaft, a steering wheel hub mounted thereon to turn therewith and removable from said shaft, a member removably attached to said shaft above said wheel hub to prevent removal of said wheel hub, a movable locking member mounted in said hub adapted to occupy two positions and when in one position to allow and when in the other position co-operating with said removable member to prevent removal of said removable member from said shaft, said wheel hub being removable from the shaft after said member is removed from the shaft.

3. In steering mechanism, a rotatable steering shaft, a stationary casing for said shaft a steering wheel comprising a hub mounted on and removable from said shaft, means removably connected to said shaft and adapted to overlie said wheel hub to prevent removal of said wheel from said shaft, and slidable locking means carried by said wheel hub and adapted to engage said stationary casing and said first mentioned means to prevent removal of said first mentioned means and wheel from said shaft and simultaneously prevent rotation of said shaft by said wheel.

4. In steering mechanism, a rotatable steering shaft, a steering wheel head mounted on and removable from said shaft, a member threaded to the upper end of said shaft to prevent removal of said wheel head from the shaft, a lock movable in the wheel head longitudinally of the shaft, said lock when in one position co-operating with said member to prevent removal of it from the shaft and simultaneously preventing rotation of the wheel head and shaft, said lock when in another position allowing removal of said member and wheel head from the shaft and allow rotation of said shaft, and means to secure the lock in either of said two positions.

5. The combination with a steering gear including a rotatable steering shaft, a steering wheel, an internal stationary gear, a drive pinion operated by the wheel, rotatable and bodily rotatable gears meshing with the stationary gear and pinion, a gear locking member carried by the wheel above said gears and rotatable about the axis of said shaft and adapted to be moved downwardly and longitudinally of the shaft and locked in the path of travel of said bodily rotatable gears.

6. The combination with a steering gear including a rotatable steering shaft, a steering wheel, an internal stationary gear, a drive pinion operated by the wheel, rotatable and bodily rotatable gears meshing with the stationary gear and pinion, a gear locking member carried by the wheel and rotatable about the axis of said shaft and adapted to be moved longitudinally of said shaft in the path of travel of said bodily rotatable gears to prevent their operation, means to lock said locking member in the path of travel of said bodily rotatable gears, and means to move and hold said locking member out of the path of travel of said bodily rotatable gears.

7. The combination with a steering gear including a rotatable steering shaft, a steering wheel, an internal stationary gear, a drive pinion operated by the wheel, rotatable and bodily rotatable gears meshing with the stationary gear and pinion, a key operated lock and locking member movable together and carried by the wheel and rotatable about the axis of said shaft, said locking member adapted to be moved in the path of travel of said bodily rotatable gears to prevent their operation, said key operated lock adapted to positively lock said locking member in and out of the path of travel of said bodily rotatable gears to prevent and permit operation of said gears.

8. In a steering wheel and rotatable shaft locking means, a wheel head connected to the steering wheel and rotatable therewith, a movable locking member mounted in said wheel head and slidable to operative or inoperative positions and when in operative position adapted to prevent rotation of the wheel head and shaft, a surface of said locking member extending beyond the wheel head so that said locking member can be manually slid to operative position and resilient means mounted in the head to slide said locking member to inoperative position, and key operated locking means to lock the locking member in operative position.

9. In combination, a rotatable steering shaft, a wheel hub mounted on and to rotate with said shaft, a stationary member, a movable member mounted in the head and slidable longitudinally of the shaft to operative or inoperative positions and when in operative position adapted to engage said stationary member to prevent rotation of the wheel hub and shaft, said movable member adapted to extend above the wheel hub so that said movable member may be manually slid from inoperative to operative position, a spring mounted in said wheel hub for sliding said movable member from operative to inoperative position, and a key controlled detent adapted to lock said movable member in either operative or inoperative positions.

10. In combination, a rotatable steering shaft, a wheel hub mounted on and to rotate with said shaft, a stationary member, a movable member mounted in the head and slidable longitudinally of the shaft to operative or inoperative positions and when in operative position adapted to engage said stationary member to prevent rotation of the wheel hub and shaft, said movable member adapted to extend above the wheel hub so that said movable member may be manually slid from inoperative to operative position, a rotatable key controlled lock and a movable detent adapted to positively lock said movable member in either operative or inoperative positions, and resilient means to automatically slide said movable member from operative to inoperative position when the detent is moved to proper position by the rotation of said key.

11. In a steering mechanism, a casing, a rotatable steering shaft projecting into said casing, a steering wheel structure rigidly secured to said shaft above the casing, a key operated locking bolt slidable longitudinally in the wheel structure and adapted to project into said casing to lock the wheel structure rigid with said casing.

12. In combination with a steering shaft, a stationary casing therefor, a removable head mounted on and to rotate with the shaft, a removable wheel structure rigidly mounted on the head, and means carried by said head to lock the wheel structure and the head together when the shaft is rotatable relative to the casing or lock the wheel structure and head against rotation relative to said casing and simultaneously prevent the head and wheel structure from being removed from said shaft.

13. In combination with a steering shaft, a stationary casing therefor, a removable head mounted on and to rotate with the shaft, a removable wheel structure rigidly mounted on the head, locking means adapted to positively lock the wheel structure and the head together or lock the wheel structure and head against rotation relative to said casing and to prevent the head or wheel structure from being removed from said shaft.

14. In combination with a steering shaft, a head carried thereon, a wheel hub mounted in the head and secured to the shaft, the shaft having a key which serves to lock the head and wheel structure for rotation with said shaft, a stationary member, and a lock carried by the head adapted to engage the stationary member to prevent the wheel, the head and the shaft from rotating.

15. In combination with a steering shaft, a head adapted to be secured thereon, said head having a recess, the wall of which is provided with notches, a steering wheel structure comprising a hub and arms, the hub adapted to be seated in said recess of the head and the arms adapted to be received in said notches, the shaft including a key which serves to secure said head and the wheel structure to the shaft.

FREDERICK VINCENT.